Sept. 25, 1928.
G. C. MARTIN
1,685,497
SHOCK ABSORBER
Filed Oct. 27, 1924
2 Sheets-Sheet 1
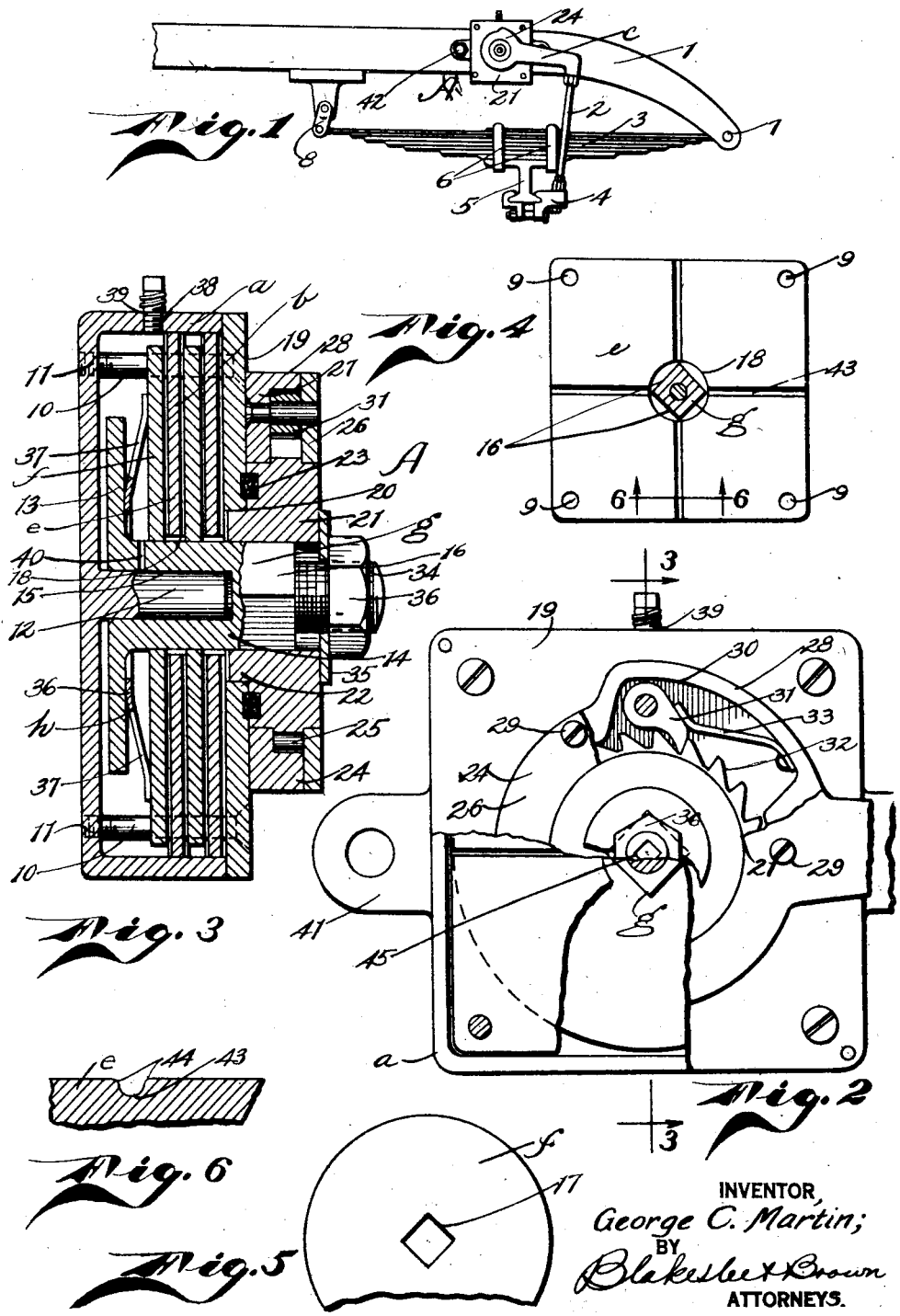
INVENTOR
George C. Martin;
BY
Blakeslee & Brown
ATTORNEYS.

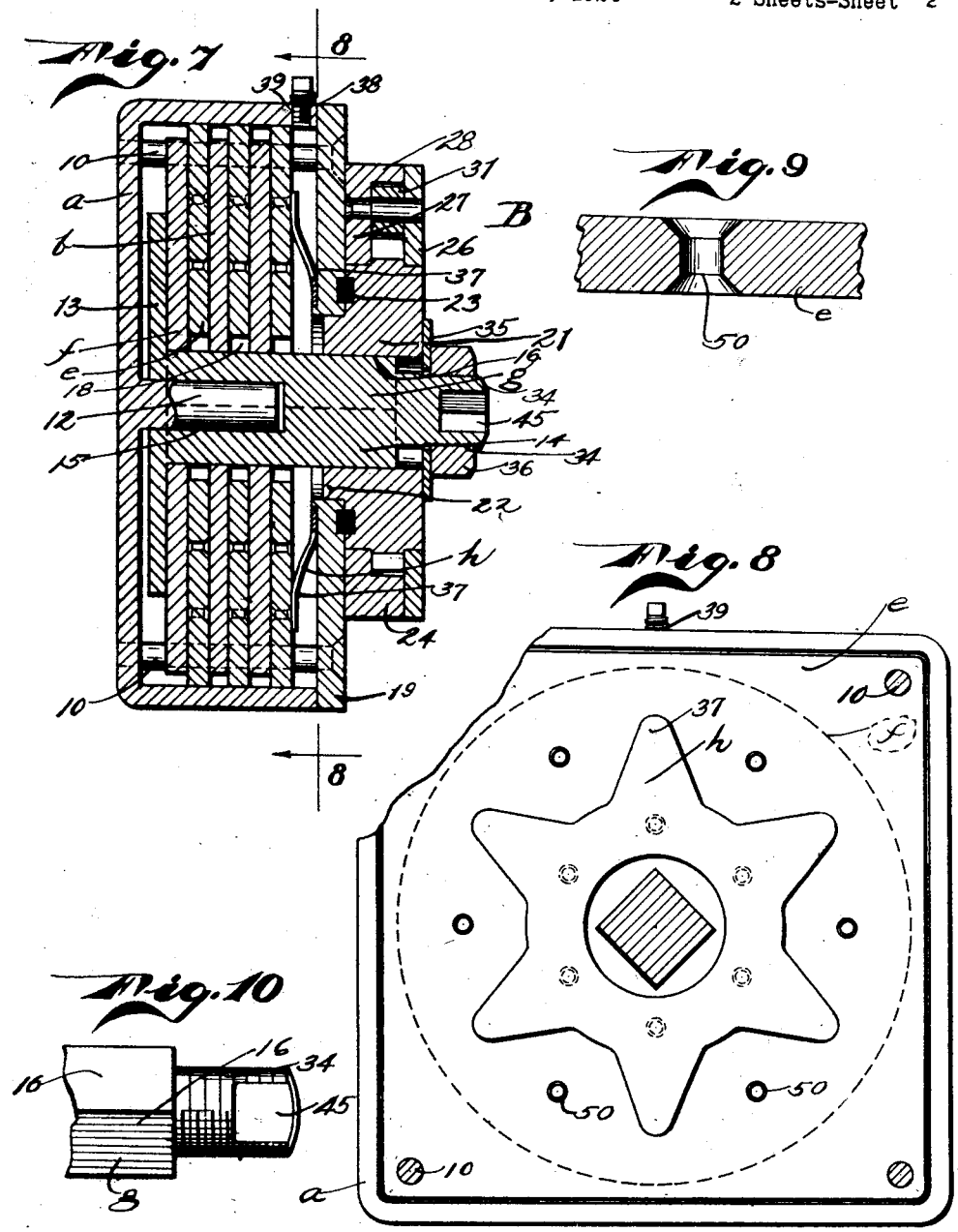

Patented Sept. 25, 1928.

1,685,497

UNITED STATES PATENT OFFICE.

GEORGE C. MARTIN, OF LOS ANGELES, CALIFORNIA.

SHOCK ABSORBER.

Application filed October 27, 1924. Serial No. 746,037.

This invention relates to shock absorbers of the class which may be incorporated with and act in conjunction with a vehicle and the spring members thereof for resisting spring recoil when the vehicle wheels contact with any unevenness in the roadway. Shock absorbers, of course, for the purpose above outlined have been in use for a long time and the present invention has for an object the provision of a shock absorber which resists the recoil of the vehicle spring or springs without retarding their compression. More particularly the present invention utilizes that form of shock absorber having a disc clutch to retard the recoil of springs. Disc clutches, of course, have been used as a coupling between the fly-wheel of an engine and the transmission, but in this latter case the pressure between the discs is variable and may be readily regulated by the operator of the vehicle. In the case of a shock absorber utilizing discs the pressure is more or less uniform and to render such type of shock absorber useful it is necessary that the discs slip smoothly. This one point alone, namely, lack of smooth slippage between the discs has spelled the failure of all disc clutches that the inventor is aware of, and the present invention has for a further object the provision of a disc clutch in which the discs will slip smoothly under all conditions to snub or retard the recoil of a spring or like member.

The inventor has found that it is necessary to lubricate the co-acting surfaces of the plates of the clutch and the present invention has for a further object a disc clutch in which the co-acting surfaces of the plates are lubricated in such a manner as not to materially reduce the co-efficient of friction between the plates, but at the same time to prevent the plates from becoming absolutely dry. It has been found that if metal plates entirely are used for the clutch, they must be lubricated with oil of just exactly the right viscosity. If the oil were too thin the plates would slip; if too thick the plates would grab, and the present invention overcomes these obstacles.

The invention has for further objects the provision of an improved shock absorber which will be superior in point of relative simplicity and inexpensiveness, taken in conjunction with utility, durability and general efficiency and serviceability.

With the above and other objects in view, the invention consists in the novel and useful provision, formation and inter-relation of parts, members and features, as indicated in certain of its embodiments in the accompanying drawings, described in the following detailed statement, and finally pointed out in the claims.

In the drawings:

Figure 1 is a fragmentary side elevation showing the improved shock absorber between the frame and the spring of a vehicle;

Figure 2 is a fragmentary face view of the shock absorber, the same being on an enlarged scale from the showing of Figure 1;

Figure 3 is a cross-sectional view on the line 3—3 of Fig. 2;

Figure 4 is a face view of one of the discs of the clutch, the same being on a reduced scale from the showing of Figures 2 and 3;

Figure 5 is a fragmentary face view of a further plate member of the clutch;

Figure 6 is an enlarged cross sectional view on the line 6—6 of Figure 4;

Figure 7 is a transverse sectional view of a modified form of the clutch;

Figure 8 is a partial fragmentary and sectional view on the line 8—8 of Fig. 7;

Figure 9 is a fragmentary cross-sectional view on an enlarged scale showing certain lubricating features of the clutch shown in Figures 7 and 8; and, Figure 10 is a fragmentary view on an enlarged scale of a boss member used in the invention.

Corresponding parts in all the figures are designated by the same reference characters.

Referring with particularity to the drawings, the improved shock absorber shown in Figures 2 to 6 inclusive is designated as an entirety in one embodiment as A and the form shown in Figures 7 to 10 inclusive by B, both of which forms may be utilized in practicing embodiments of the invention. In its primary form the devices A and B, in each instance, includes a casing or housing $a$ within which is a clutch member $b$, and an arm member $c$. The housing or casing $a$ is adapted to be connected with a frame 1 of a vehicle and the arm $c$ through the medium of a link 2 is associated with the vehicle spring 3 by the link being suitably secured by clamp means 4 to the member 5 which may be an axle or cross brace member directly coupled by clips or other means 6 with the spring 3. It is ordinary practice to couple one end of the spring 3 to the frame 1, as shown at 7, and the other end through a shackle 8 to such frame. Thus when the spring is compressed the arm c would move upwardly in the showing of Figure 1 and move downwardly when the spring recoils. It is the intention of the present absorber to check this recoil. Considering the form of the shock absorber A, the clutch discs or plates may assume various shapes; however, certain of the plates as shown in Figure 4 are substantially square, being designated as e, while others, f, may be circular in outline. The plates e would be the immovable ones, while the plate f would be movable. In order to suitably mount the plates e within the casing a, I have squared the casing and transversely bored each of the plates e adjacent their corners, as shown at 9. Means 10 which may consist of projecting studs are screw-threaded as shown at 11 into the casing a, and are so arranged within the casing that the same may be passed through the openings 9 for holding the said plates e in position. The said casing e is provided with a a central projecting member 12. A member g is carried upon such projecting members 12, and such member g includes a disc 13 provided with a hub or boss 14, said disc and said hub or boss 14 being centrally bored as shown at 15, the projection 12 being received within such bore 15. The hub or boss 14 is provided in the showing with one or more flattened faces, as shown at 16, it being noted that such hub or boss is substantially square in outline and the disc or discs f are each provided with a square central bore 17; such discs are adapted to be carried upon the boss 14. The arrangement is such that plates or discs f and e alternate, as the showing of Figure 3 indicates. Furthermore, the central openings 18 of each of such discs e is of a diameter greater than the diagonal of the square hub or boss 14, so that such member g may rotate and still not contact with such discs e. A suitable cover 19 is adapted to close the casing so as to confine the discs within such casing. This cover 19 is provided with an enlarged central opening 20 and carried upon the hub or boss 14 is a gear 21. This gear is provided with a squared central opening so as to turn when the boss 14 is turned. The gear is also flanged as shown at 22 so as to be received within the central opening 20 of the cover 19, and packing means 23 is interposed between the outer surface of such cover 19 and the gear 21. The arm c has a part 24 formed to be carried on the periphery of the gear 21. In this particular it is to be noted that the gear 21 is formed so that the portion 24 of the arm c may straddle the gear teeth 25 and likewise be carried on the periphery of the gear. In this connection the portion 24 consists of two plates 26 and 27, the plate 27 being formed with a peripheral flange 28. Furthermore, such plates are centrally bored and suitably secured together, being spaced apart by the flange 28, when such plates have been mounted upon the periphery of the gear 21 by such means as screws or the like, as shown in Figure 2 at 29. The said plates are enlarged and off-set as shown in Figure 2 at 30, so as to form a space or enclosure for a pawl 31. The teeth of the gear 21 are of the ratchet type, as shown at 32, and the pawl is adapted to contact with such teeth, being held in engagement therewith by suitable means such as a leaf spring 33 associated with the flange 28. The hub or boss 14 is likewise provided with a screw-threaded portion 34 and a washer 35 carried upon such screw-threaded portion is adapted to bear against a surface of the gear 21. A nut 36 is carried upon such screw-threaded portion 34.

In order that there may be a frictional engagement between the stationary and movable plates I have provided means h which may comprise a member 36 carried upon the hub or boss 14, and which member 36 is provided with spring arms 37 adapted to bear against the surface of one of the movable discs f. It is to be further noted that the casing a is provided with a screw plug 38 received in a screw-threaded opening 39 of such casing. Furthermore, the hub or boss 14 is bored as shown at 40 so that the contacting surfaces between the hub 14 and the projection 12 may be lubricated. It will readily be seen that there would practically be no oil loss because of the packing 23 between the gear 21 and the cover 19. By turning the nuts 36 upon the screw-threaded portion 34 the pressure between the plates of the clutch is readily adjusted.

The said casing a is provided with two or more wings 41 which are bored so that the said casing may be secured to the frame 1 by bolts or other means 42. When the arm c is moved in an anti-clockwise direction the gear 21 is not turned, it being noted that the pawl 31 will slip from one tooth to the next adjacent tooth, and the clutch portion of such device will remain inactive. Movement of the arm c in a clockwise or downward direction will cause the gear to turn due to the fact that the pawl 31 engages the teeth 32 of such gear. Thus there will be a clutching action when the arm is moved in one direction and a free movement when moved in an opposite direction. This clutch is so arranged and formed that the disc members thereof slip smoothly and this is accomplished in part by the manner in which the surfaces of the plates of the clutch are lubricated.

Figure 4 which is representative of one of the immovable plates shows that the same is provided with radial grooves 43 and that such radial grooves, as the showing of Figure 6 reveals, are provided with rounded edge portions 44. The edges are so formed in order that friction between the plates will not scrape material from the surfaces of such plates and fill the grooves 43 and prevent the proper lubrication of the surfaces of such discs. Preferably the movable discs are formed of fiber or other friction material such as wood, leather, brake lining, or the like, while the discs or plates e are of polished metal. By rounding the grooves 43 as shown at 44, it is evident that undue wear of the discs f is prevented.

It has been found that unless the surfaces between the movable and immovable discs of the clutch are not kept properly moistened with grease or oil or other lubricating substances, they will chatter and grab, and not work properly as a shock absorber. If they do not have enough lubricant they offer too little friction between the plates to be of any value as a shock absorber. The plates must be kept sufficiently lubricated to prevent the movable members from having their surfaces become glazed. The method of lubricating the co-acting surfaces between the plates e and f, as hereinabove outlined, works very satisfactorily and the shock absorber will work for a long period of time without any attention. Furthermore, it is evident that the shock absorber is of simple construction and may be readily taken apart and put together again by any mechanically inclined person.

Another feature of the invention is the providing of a square opening 45 in the end of the screw-threaded part 34. A wrench of any suitable form may be placed therein to hold the hub against turning, while the screw 36 is being turned to move the hub 14 to increase or decrease the pressure of the spring fingers 37 against one of the plates f, which pressure would increase or decrease the friction existing between the plates e and f.

The form of the clutch shown in Figures 7 to 10 inclusive designated as B does not differ in the essential details from the form just described and designated as A. The form B may be simpler to assemble, it being noted that the member h, which is a clover leaf spring member as Figure 8 reveals, bears against one of the immovable discs e. Whenever possible the same reference characters given the parts for the form A will apply to the form B. All the parts are identical with the form shown in A, with this possible exception, that one of the movable discs bears against a surface of the member 13 associated with the hub 14 after which there are alternately arranged fixed discs and movable discs. The fixed discs are provided with transverse bores 50, which bores are of the counter-sunk type adjacent the surfaces of such discs e. These bores are adapted to be filled with grease or other lubricating substances.

The operation of the device would be the same as for the device A.

In order to lubricate the clutch discs it is only necessary to remove the plug 38 from its engagement with the casing a in either form of the devices A or B, and fill the casing with grease or other lubricating fluid through the medium of a grease gun. The shock absorbing device will then require little attention on the part of the user.

It is obvious that various changes and modifications and variations may be made in practicing the invention, in departure from the particular showing, without departing from the true spirit of the invention.

Having thus disclosed my invention, I claim and desire to secure by Letters Patent:

1. A shock absorber comprising a rectangular casing, a cover for said casing having a round central opening, a ratchet toothed gear having an offset flange portion journaled in said cover, a hub including a squared shank interlocked with the gear, a plurality of stationary clutch plates conforming in shape to the casing and interlocked therewith, and a plurality of movable disks interlocked with the squared shank of the hub and arranged between said stationary clutch plates, means for pressing said stationary clutch plates and movable discs in frictional contact, and a lever carrying a pawl operating in conjunction with said ratchet toothed gear whereby movement of the lever in one direction does not move the gear but movement in the other direction will move the gear against the frictional resistance of movable discs and stationary clutch plates.

2. A shock absorber including a casing of rectangular shape having a central projection, a cover having a central opening, a ratchet toothed gear having an offset flanged portion operating in said central opening of the cover, a hub having a squared shank portion interlocked with the gear and provided with a socket for receiving the central projection of the cover, a plurality of stationary clutch plates conforming in shape to the casing and having grooves therein, and a plurality of movable discs arranged between said stationary clutch plates and interlocked with the squared shank portion of the hub, and a pawl carrying lever cooperating with said ratchet toothed gear to operate said hub and move the movable discs between the grooved stationary clutch plates.

3. A shock absorber including stationary metal clutch plates having right angularly disposed lubricant feeding grooves extending from the center thereof toward an edge, said grooves having rounded edges at the faces of the plates, and a plurality of non-metallic movable discs arranged between said stationary clutch plates, a spring for pressing said discs and clutch plates together, and means for moving said discs between the clutch plates.

In testimony whereof, I have signed my name to this specification.

GEORGE C. MARTIN.